Patented May 9, 1933

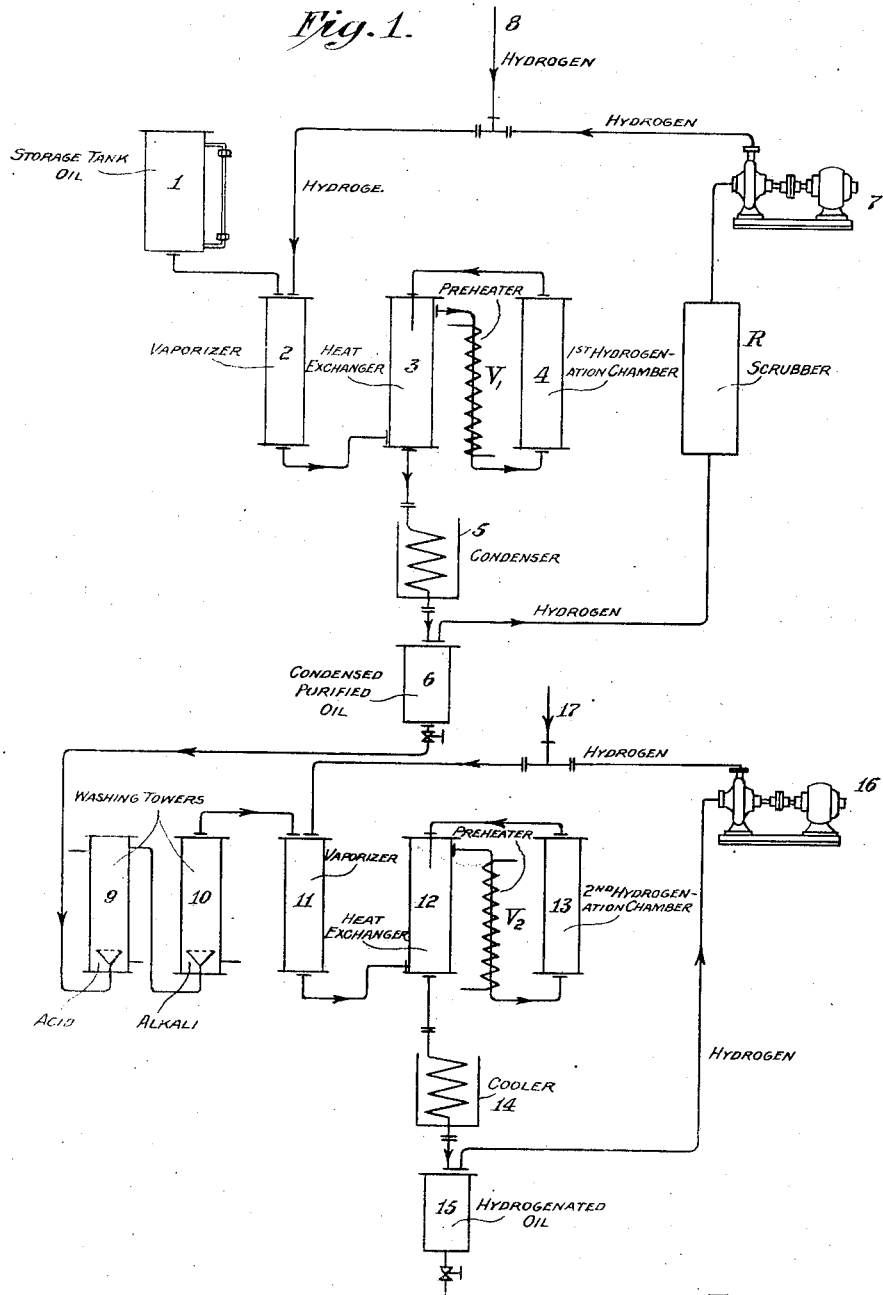

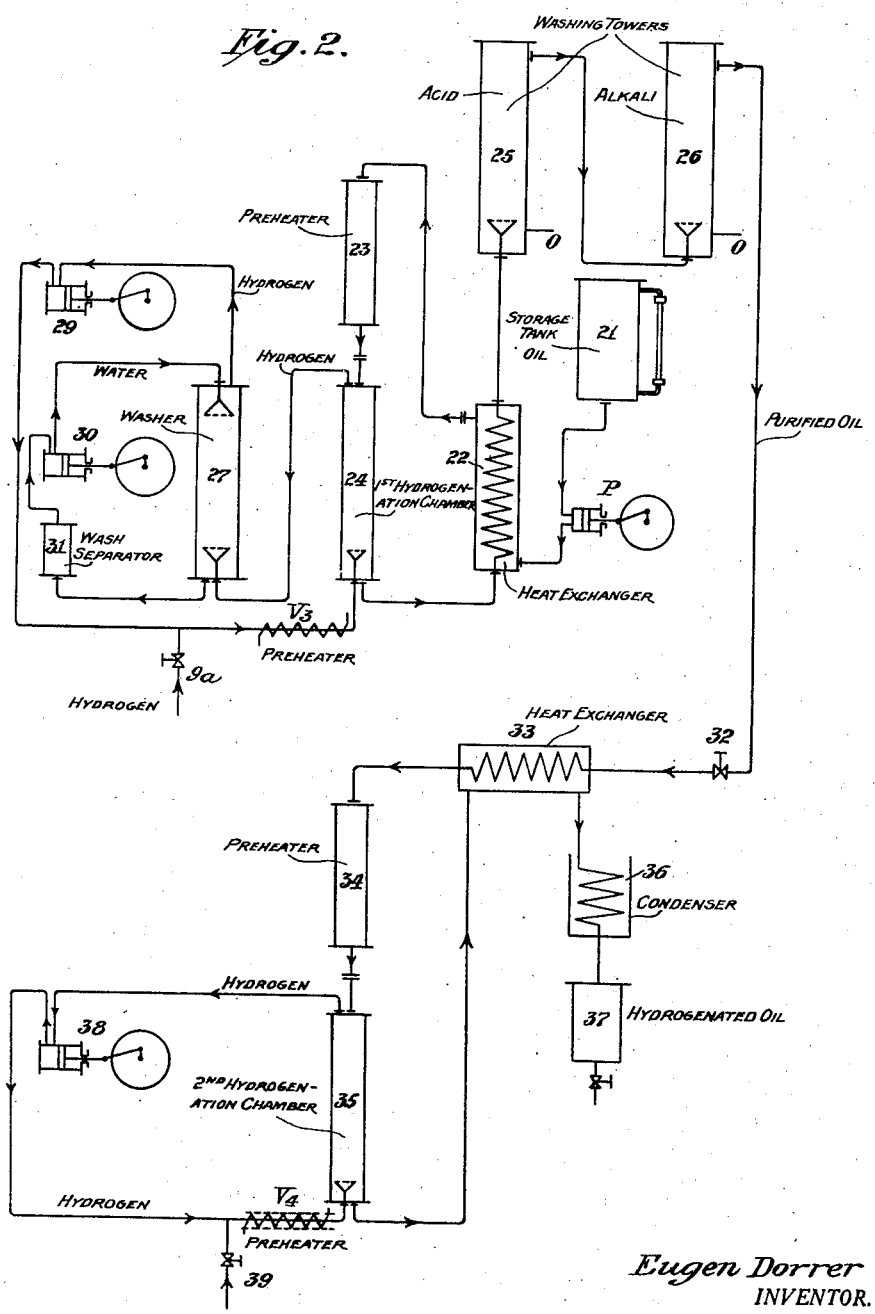

1,908,286

UNITED STATES PATENT OFFICE

EUGEN DORRER, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY

PRODUCTION OF HYDROCARBONS

Application filed November 30, 1929, Serial No. 410,885, and in Germany December 3, 1928.

This invention relates to improvements in the manufacture and production of hydrocarbons which are saturated with hydrogen.

It has already been proposed to eliminate the sulphur and the oxygen compounds from hydrocarbons and mixtures of hydrocarbons, such as mineral oils, tar oils, and fractions of these, such as solvent benzol, naphthalene and the like, by passing these materials together with hydrogen over catalysts at elevated temperatures and, if desired, under pressure. To hydrocarbons purified in this manner there is the objection, however, that in subsequent hydrogenation, the ordinary catalysts employed therefor, are so quickly poisoned, in spite of the purification, that a complete hydrogenation, as for example the hydrogenation of xylene into hexahydroxylene, cannot be effected after this previous purification.

I have now found that hydrocarbons, which are completely saturated with hydrogen are readily obtained from crude hydrocarbons containing double bonds, namely, unsaturated or aromatic hydrocarbons or mixtures containing the same when the initial materials together with hydrogen or gases containing or supplying the same which may, for example, also contain nitrogen or water vapor are treated under ordinary or increased pressure and at temperatures above about 200° C. and usually up to about 450° C., but preferably not above 350° C. with catalysts, preferably deposited or precipitated on or applied to carriers, which catalysts contain the solid oxides or sulphides of the metals of the second to the seventh groups of the periodic system or compounds of these metals supplying the said oxides or sulphides, preferably those of the sixth group, or mixtures thereof, and preferably in conjunction with metals of the eighth group, or with heavy metals of the first group of the periodic system, namely copper, silver or gold, or compounds thereof, consisting of or supplying oxides or sulphides or metals or mixtures of the same, for such a period of time that not only any sulphur or oxygen compounds present in the materials under treatment, but also the nitrogen and halogen compounds, which may be present as well as resinifying substances are rendered non-injurious, without the occurrence of any appreciable splitting up of the hydrocarbons themselves, the hydrocarbons thus obtained being then hydrogenated in the presence of catalysts. Oxides or sulphides of metals are hereinafter referred to collectively as compounds of a metal with a metalloid from the sixth group of the periodic system. The said catalysts at the same time promote the conversion of the organically combined sulphur, oxygen, nitrogen and halogens present in the crude initial materials into their hydrogen-compounds, namely hydrogen sulphide, water, ammonia and hydrogen halides, and also the saturation with hydrogen of substances, such as olefines, having a tendency to resinify.

The duration of the treatment in the first stage of the process is dependent on the nature of the materials under treatment and on the nature of the impurities to be removed. Thus the sulphur compounds can usually be removed with the least difficulty, whereas the difficulty as a general rule increases in the following order: compounds of oxygen, halogen compounds and nitrogen compounds and the duration of the treatment must be correspondingly increased. The duration of the treatment may usually be decreased as the pressure of the hydrogenating gas is increased. Also the greater is the activity of the catalyst employed the shorter will be the duration of the treatment. In any case the first stage of the process is carried out for so long until the sulphur, oxygen, halogens and nitrogen can no longer be analytically detected in the materials under treatment.

The following catalysts have been found to be particularly advantageous for carrying out the first stage of the process according to the present invention. In the combinations given, the metals in so far as they belong to the 2nd to the 7th groups of the periodic system may be employed in the form of their oxides or sulphides, whereas the metals specified which belong to the 1st and the 8th groups of the periodic system may be employed in the metallic form or as compounds, such for example as oxides or sulphides or as compounds supplying the said metals or the said compounds. The said catalysts may be mixed in any desired proportions, but usually molecular proportions have been found to be most advantageous. Such catalytic mixtures are, for example, cobalt and tungsten; iron and molybdenum; cobalt, molybdenum and copper; nickel and chromium; iron and calcium; nickel and arsenic; cobalt and antimony; zinc and molybdenum; nickel and tin; cadmium, iron and antimony; nickel and molybdenum; iron and tungsten; tin and lead; cobalt and molybdenum; aluminium and molybdenum; aluminium, chromium and nickel; platinum and tungsten; palladium and chromium; osmium and arsenic; osmium and molybdenum; cobalt and antimony; cobalt and calcium; cobalt, nickel and chromium; palladium, zinc and molybdenum; aluminium, arsenic and chromium; copper, tungsten and tin; osmium, platinum and tin; nickel and antimony; silver, nickel and molybdenum; silver and molybdenum; tungsten, molybdenum and silver; cobalt and chromium; zinc and tungsten; cadmium and molybdenum or nickel; cadmium and molybdenum. As typical examples of carriers to which the said catalysts may be applied or on which they may be deposited may be mentioned, active charcoal, fuller's earth, Florida earth, diatomaceous earth, silica gel, alumina gel, pumice stone, bauxite, burnt fire-clay and the like.

By working in this manner the ethylene double bonds of any coumarones, indenes and other resinifying constituents which are present are hydrogenated in the first stage of the treatment, and any organically combined oxygen is separated as water and any organically combined nitrogen as ammonia. From the halogen compounds, traces of which are frequently present in the initial materials and which have a poisonous action on the catalysts in the subsequent hydrogenation, the halogens are split off as hydrogen halides. Usually pressures ranging between atmospheric and 100 atmospheres may be employed, but in some cases higher pressures, for example 150, 200 or even 1000 atmospheres may be employed.

The compounds purified in this manner are entirely free from catalyst poisons.

The products to be treated may, if required, be subjected to a washing or purification of the usual kind between the single stages of the process, as for example with dilute acid or aqueous alkali in order to remove the last traces of any ammonia or hydrogen sulphide and the like formed and dissolved therein.

In the following second stage a complete hydrogenation proceeds readily with the usual hydrogenating catalysts such as nickel, cobalt, copper and the like, and these latter retain their activity practically unchanged. These catalysts may be activated by an addition of elements, in particular, metals from the second to the 7th groups of the periodic system, for example, of chromium, aluminium, molybdenum and the like or compounds thereof not already contained in the catalyst. The said catalysts may be deposited on carriers, such as pumice stone, active charcoal, Florida earth, silica gel or other substances, in particular those having a large surface area. In order to carry out this said complete hydrogenation the process may be carried out at atmospheric or elevated pressure. When working at atmospheric pressure a temperature of between about 150° and 250° C. has been found usually to be advantageous, whereas elevated pressures permit of the employment of higher temperatures. Thus for example at 150 atmospheres temperatures ranging between about 250° and 350° C. may be employed, whereby a very considerable acceleration of the speed of the reaction is attained. At these temperatures no substantial splitting of the hydrocarbon products occurs.

By the process in accordance with the present invention it is possible to convert unsaturated or aromatic hydrocarbons or mixtures of the same from any source, for example tar oils, mineral oils, and the like, products from cracking, products from the extraction of coal and the like, and also fractions having a narrow boiling point range or substances of uniform chemical nature, such as crude benzene, xylene, naphthalene, anthracene oil, solvent benzol and the like, into completely saturated hydrocarbons, which conversion is not possible after simply removing the sulphur and oxygen from the initial materials.

It is advantageous when treating crude polynuclear aromatic hydrocarbons to work under conditions, as for example as regards pressure of hydrogen, activity of the catalyst or duration of the treatment, in the first stage more vigorous than those above-mentioned, so that in addition to the purification of the hydrocarbons, a hydrogenation of some but not all of the double bonds in the molecule of the initial material takes place. It is preferable to employ the aforesaid catalysts, which are immune from poisoning by sulphur on carriers presenting a large surface area and to work under high pressure as for example at a hydrogen pressure of 100 atmospheres and more and at temperatures above 200° C., but preferably not above 350° C., since otherwise there is a danger that the products formed by the hydrogenation may be decomposed.

The hydrogenation step may be carried out in several different stages of working.

Working in this manner has the advantage that when working up crude polynuclear aromatic hydrocarbons, products substantially all the double bonds of which are saturated with hydrogen may be obtained very rapidly. The saturation of polynuclear aromatic hydrocarbons with hydrogen becomes more difficult the higher is the degree of saturation of the products. Thus the hydrogenation of naphthalene into tetrahydronaphthalene takes place under quite mild conditions in the first stage of the process, whereas the conversion of tetrahydronaphthalene into decahydronaphthalene in the second stage is somewhat more difficult. Generally speaking the higher the activity of a catalyst the higher is its sensibility to poisoning. It is thus made possible to employ in the stage or stages following on the first stage of the process the very active hydrogenating catalysts, such as nickel, cobalt, copper and the like, which are not proof against poisoning, without their activity being injuriously affected.

The invention will be further illustrated with reference to the accompanying drawings diagrammatically showing elevations of plants suitable for carrying out the process according to the present invention, the invention is, however, not restricted to the particular arrangements shown in these drawings.

Referring to Figure 1 which shows an arrangement for working under ordinary pressure numeral 1 denotes a vessel in which the hydrocarbon product to be refined and hydrogenated is stored. From thence this product is conveyed to the vaporizer 2 in which it is commingled with hydrogen supplied from 8 or recycled from pump 7. It is then passed through the heat exchanger 3 and thereupon heated in heater $V_1$ to the temperature required for purifying it in contact with catalysts in the chamber 4. The products issuing from this chamber are made use of for heating by indirect heat exchange fresh amounts of initial materials in heat-exchanger 3 and then condensed in the condenser 5. The condensed product is collected in vessel 6. The uncondensed waste hydrogen is purified in vessel R by means of a suitable absorbing agent, such as caustic soda solution, dilute acid or water, from hydrogen sulphide, ammonia and hydrogen halides formed in vessel 4, and then led to the recycling pump 7.

The product collected in vessel 6 contains in solution more or less large amounts of hydrogen sulphide, ammonia and hydrogen halides, and is, for the removal of these compounds, passed through the washing towers 9 and 10 filled with Raschig rings through which a 10 per cent sulphuric acid and a 10 per cent caustic soda solution respectively are passed in counter-current. The purified product is then conveyed to the vaporizer 11 in which it is mixed with hydrogen supplied from 17 or recycled by pump 16, thereupon led into the heat-exchanger 12 and then, after further heating in heater $V_2$, passed into the chamber 13 where it is hydrogenated in contact with a suitable hydrogenating catalyst. The hydrogenated product is then conveyed into the heat-exchanger 12 in which it gives up part of its heat for heating further amounts of purified product to be hydrogenated, and is, after condensation in condenser 14, collected in vessel 15. The uncondensed hydrogen is recycled to the chamber 11 by way of pump 16.

Figure 2 represents an arrangement in which the process according to the present invention may be carried out under pressure. A crude liquid hydrocarbon, such as gas oil or heavy oil, stored in vessel 21 is pumped by means of pump P through the heat exchanger 22 into the preheater 23. From thence it is led into the purifying vessel 24 through which it is passed in counter-current to the purifying hydrogen. The thus treated hydrocarbon liquid collecting at the bottom of vessel 24 is conveyed into the heat-exchanger 22 in which it gives up part of its heat to fresh material, and then successively treated with dilute sulphuric acid and with dilute caustic soda solution in vessels 25 and 26, respectively. In this manner the liquid hydrocarbon product is freed from impurities, such as hydrogen sulphide, ammonia and hydrogen halides dissolved therein. The waste hydrogen issuing from vessel 24 is, if desired, freed from oil carried off with it in a separator (not shown) and then passed through the washing tower 27 through which by means of a pump 30 water is passed while under pressure, in counter-current to said hydrogen. The water dissolves the impurities, such as hydrogen sulphide, ammonia and hydrogen halides contained in the waste hydrogen. The washing water is freed from the said impurities by releasing it from pressure in vessel 31. The purified hydrogen is recycled by way of pump 29 and preheater $V_3$ to the vessel 24. Fresh hydrogen is supplied at 9a.

The hydrocarbon product issuing from vessel 26 and which is free from impurities having any contact-poisoning effect is passed through a pressure regulator 32 and then streams at the same or under reduced pressure through the heat-exchanger 33 and the preheater 34 into the vessel 35 provided with a rigidly arranged hydrogenation catalyst. In this vessel the said product is treated with hydrogen maintained in circulation by pump 38 and heated before its entrance into vessel 35 in heater $V_4$. Fresh hydrogen is supplied at 39. The hydrogenated product leaves vessel 35 at the bottom, is conveyed through heat-exchanger 33, cooled in cooler 36 and collected in vessel 37.

The following examples will further illustrate the nature of this invention, but the invention is not restricted to these examples.

Example 1

Solvent naphtha, which has a boiling point range of from 130° to 200° C. and a specific gravity of 0.872 and gives a strong coloration with concentrated sulphuric acid, and which contains about 5 per cent of pyridine bases and phenols, 0.1 per cent of sulphur and about 0.17 per cent of halogen, is passed in a stream of hydrogen at a temperature of 350° C. and at ordinary pressure over a catalyst consisting of equal amounts of cobalt and tungsten sulphides on active carbon, so slowly that the product leaving the catalyst no longer contains any nitrogen and halogen compounds and no resinified constituents. Only a weak coloration now occurs on the addition of sulphuric acid to the liquid product obtained by cooling. Neither pyridine nor phenols can be detected by analysis, and the halogen and sulphur content is less than a millionth part. The hydrogen used in the first stage may be continuously circulated while removing the hydrogen sulphide and ammonia contained therein, by an intercalating washing operation, for example with acid for removing the ammonia and caustic soda lye for absorbing the hydrogen sulphide.

The product obtained in the first stage is then passed together with pure hydrogen, at a temperature of 190° C. and at atmospheric pressure over a catalyst prepared by the precipitation of nickel carbonate on pumice stone, and subsequent reduction at a temperature of about 400° C. The product thereby obtained boils between 120° and 180° C. and is not acted upon at all by concentrated sulfuric acid or nitrogenating acid. It has a specific gravity of 0.790 and a pleasant odour in part reminiscent of cyclohexane and in part of terpenes.

Example 2

A fraction obtained by the desctructive hydrogenation of brown coal, which gives a deep black coloration with concentrated sulphuric acid and has a boiling point range of from 215° to 275° C. and the specific gravity 0.855 and which contains 0.5 per cent of oxygen, 0.21 per cent of sulphur and 0.02 per cent of halogen is slowly passed, as described in Example 1, over a catalyst consisting of equal amounts of zinc and molybdenum sulphides precipitated on Florida earth, at a temperature of 350° C. and with hydrogen at a pressure of 50 atmospheres. About 25 parts by volume of the initial materials are passed hourly over 100 parts by volume of the catalyst. A pure product which is capable of being readily hydrogenated is thus obtained, on cooling, and washing the condensate with alkali solutions in order to remove the last traces of hydrogen sulphide and hydrogen chloride therefrom.

The said product is converted into an entirely saturated, pure hydrocarbon mixture boiling between about 200° and 260° C. which is colorless, and gives only a slight coloration with concentrated sulphuric acid or nitrogenating acid, and has the specific gravity 0.825, by treatment with hydrogen under a pressure of 50 atmospheres and at a temperature of about 220° C. in the presence of a catalyst consisting of nickel and 10 per cent of chromium oxide deposited on active carbon.

Example 3

An American gas oil boiling between about 200° and 340° C., having the specific gravity 0.856 and containing 5.05 per cent of nitrogen, 0.56 per cent of sulphur and 0.3 per cent of naphthenic acids is passed in the liquid state at a temperature of 350° C. and under a pressure of 200 atmospheres in a countercurrent to hydrogen so slowly over a catalyst consisting of cobalt sulphide and molybdenum oxide deposited on fuller's earth that the content of the oil in nitrogen, sulphur and oxygen sinks below the limit which can be detected by analysis. About 85 parts by volume of the gas oil are passed hourly over 100 parts by volume of the catalyst. The product thus obtained reacts only to a very slight extent with sulphuric acid. It is again treated with hydrogen with a nickel catalyst under a pressure of 100 atmospheres. A colorless hydrogenation product having a specific gravity at 10° C. of 0.820 is thus obtained, which has a boiling point range of between 160 and 310° C. The said product is not acted on by sulphuric acid or by nitrogenating acid mixtures; it has a very agreeable odor.

Example 4

100 parts of naphthalene recovered by centrifuging from a middle oil distilled from tar and containing 0.13 per cent of sulphur are treated with hydrogen under a pressure of 150 atmospheres at a temperature of 330° C. in the presence of 10 parts of a catalyst prepared from cobalt oxide and molybdenum oxide (0.2 part of cobalt and 0.4 part of molybdenum) precipitated on active silica. About 55 parts by volume of naphthalene are passed hourly over 100 parts by volume of the catalyst. The reaction product having a boiling point of from about 198° to 210° C. thus obtained consists of tetrahydronaphthalene and only contains about 5 per cent of decahydronaphthalene. The product is washed with dilute caustic soda solution in order to remove the hydrogen sulphide dissolved therein and is passed in the liquid phase in a second stage over an ordinary nickel catalyst at 220° C. with hydrogen under a pressure of 15 atmospheres and is thus hydrogenated into decahydronaphthalene having a boiling point of from about 187° to 190° C.

Example 5

100 parts of anthracene having a sulphur content of 0.05 per cent are treated at 350° C. with hydrogen under a pressure of 150 atmospheres in the presence of a catalyst consisting of nickel sulphide (0.3 part of nickel and 0.9 part of tungsten) precipitated onto active charcoal. 47 parts by volume of anthracene are passed hourly over 100 parts by volume of the catalyst. The reaction product boils at from 290° to 310° C. and consists of a mixture of lower hydrogenation products of anthracene. After removing traces of hydrogen sulphide the product is passed over an active catalyst which is fairly immune from poisoning, and which is prepared from nickel oxide and aluminium oxide (1 part of nickel and 0.5 part of aluminium) under a hydrogen pressure of about 150 atmospheres and at about 250° C. and is thus hydrogenated into a mixture of products having a higher degree of saturation with hydrogen and having a boiling point of from 270° to 295° C. The liquid reaction product consists of a mixture of the solid octohydroanthracene (melting point 76° C.) and the liquid dodecahydroanthracene.

This mixture may then be hydrogenated in a third stage in the presence of a catalyst consisting of active nickel on a carrier (1 part of nickel) into crystallized tetradecahydroanthracene having a melting point of 87° C. and a boiling point of from 270° to 280° C. under a pressure of about 150 atmospheres of hydrogen and at a temperature of about 250° C.

What I claim is:—

1. A process for the production of hydrocarbons, completely saturated with hydrogen, from crude hydrocarbons containing double bonds which comprises treating an initial material of the said nature with a gas comprising hydrogen at a temperature between about 200° and 450° C. in the presence of a catalyst comprising a compound of a metal from the fourth to the sixth group of the periodic system with a metalloid from the sixth group of the periodic system for such a period of time that not only the sulphur or oxygen compounds present in the materials under treatment, but also the nitrogen and halogen compounds are converted into the hydrides of sulphur, oxygen, nitrogen and halogens, respectively, and that the resinifying susbtances are saturated with hydrogen, but for an insufficient period of time to effect any appreciable splitting up of the initial hydrocarbons, separating the said hydrides from the resulting hydrocarbons, and saturating the double bonds of the hydrocarbons thus obtained with hydrogen at an elevated temperature below 350° C. in the presence of a catalyst promoting the hydrogenation of double carbon bonds.

2. A process for the production of hydrocarbons, completely saturated with hydrogen, from crude hydrocarbons containing double bonds which comprises treating an initial material of the said nature with a gas comprising hydrogen at a temperature between about 200° and 450° C. in the presence of a catalyst comprising a compound of a metal from the fourth to the sixth group of the periodic system with a metalloid from the sixth group of the periodic system, in admixture with a substance comprising a metal selected from the class consisting of the metals from the second, third and eighth group of the periodic system and the heavy metals from the first group of the periodic system, for such a period of time that not only the sulphur or oxygen compounds present in the materials under treatment, but also the nitrogen and halogen compounds are converted into the hydrides of sulphur, oxygen, nitrogen and halogens, respectively, and that the resinifying substances are saturated with hydrogen, but for an insufficient period of time to effect any appreciable splitting up of the initial hydrocarbons, separating the said hydrides from the resulting hydrocarbons, and saturating the double bonds of the hydrocarbons thus obtained with hydrogen at an elevated temperature below 350° C. in the presence of a catalyst promoting the hydrogenation of double carbon bonds.

3. A process for the production of hydrocarbons, completely saturated with hydrogen, from crude hydrocarbons containing double bonds which comprises treating an initial material of the said nature with a gas comprising hydrogen at a temperature between about 200° and 450° C. in the presence of a catalyst comprising a compound of a metal from the fourth to the sixth group of the periodic system with a metalloid from the sixth group of the periodic system for such a period of time that not only the sulphur or oxygen compounds present in the materials under treatment, but also the nitrogen and halogen compounds are converted into the hydrides of sulphur, oxygen, nitrogen and halogens, respectively, and that the resinifying substances are saturated with hydrogen, and under such conditions that a partial hydrogenation is simultaneously effected, but for an insufficient period of time to effect any appreciable splitting up of the initial hydrocarbons, separating the said hydrides from the resulting hydrocarbons, and saturating the double bonds of the hydrocarbons thus obtained with hydrogen at an elevated temperature below 350° C. in the presence of a catalyst promoting the hydrogenation of double carbon bonds.

4. A process for the production of hydrocarbons, completely saturated with hydrogen, from crude hydrocarbons containing double bonds which comprises treating an initial material of the said nature with a gas comprising hydrogen at a temperature between about 200° and 450° C. in the presence of a catalyst comprising a compound of a metal from the fourth to the sixth group of the periodic system with a metalloid from the sixth group of the periodic system for such a period of time that not only the sulphur or oxygen compounds present in the materials under treatment, but also the nitrogen and halogen compounds are converted into the hydrides of sulphur, oxygen, nitrogen and halogens, respectively, and that the resinifying substances are saturated with hydrogen, but for an insufficient period of time to effect any substantial splitting up of the initial hydrocarbons, removing any hydrogen sulphide and ammonia present by washing, and saturating the double bonds of the hydrocarbons thus obtained with hydrogen at an elevated temperature below 350° C. in the presence of a catalyst promoting the hydrogenation of double carbon bonds.

5. A process for the production of hydrocarbons, completely saturated with hydrogen, from crude hydrocarbons containing double bonds which comprises treating an initial material of the said nature with hydrogen under pressure between 1 and 200 atmospheres at a temperature of between 200° and 350° C. in the presence of a catalyst comprising a sulphide of a metal of the sixth group of the periodic system for such a period of time that not only the sulphur or oxygen compounds present in the materials under treatment, but also the nitrogen and halogen compounds are converted into the hydrides of sulphur, oxygen, nitrogen and halogens, respectively, and that the resinifying substances are saturated with hydrogen, but for an insufficient period of time to effect any appreciable splitting up of the initial hydrocarbons, separating the said hydrides from the resulting hydrocarbons, and saturating the double bonds of the hydrocarbons thus obtained with hydrogen at an elevated temperature below 350° C. in the presence of a catalyst promoting the hydrogenation of double carbon bonds.

6. A process for the production of hydrocarbons completely saturated with hydrogen, from crude hydrocarbons containing double bonds, which comprises treating an initial material of the said nature at the rate of 25 to 85 parts by volume per hour for each 100 parts by volume of the catalyst with a gas comprising hydrogen at a temperature between about 200° and 450° C. in the presence of a catalyst comprising a compound of a metal from the fourth to the sixth group of the periodic system with a metalloid from the sixth group of the periodic system for such a period of time that not only the sulphur or oxygen compounds present in the materials under treatment, but also the nitrogen and halogen compounds are converted into the hydrides of sulphur, oxygen, nitrogen and halogen, respectively, and that the resinifying substances are saturated with hydrogen, without the occurrence of any appreciable splitting up of the initial hydrocarbon itself, separating the said hydrides from the resulting hydrocarbon, and saturating the double bonds of the hydrocarbon thus obtained with hydrogen at an elevated temperature below 350° C. in the presence of a catalyst promoting the hydrogenation of double carbon bonds.

7. A process for the production of hydrocarbons completely saturated with hydrogen, from crude hydrocarbons containing double bonds, which comprises treating an initial material of the said nature at the rate of 25 to 85 parts by volume per hour for each 100 parts by volume of the catalyst with a gas comprising hydrogen at a temperature between about 200° and 450° C. in the presence of a catalyst comprising a compound of a metal from the fourth to the sixth group of the periodic system with a metalloid from the sixth group of the periodic system, in admixture with a substance comprising a metal selected from the class consisting of the metals from the second, third and the eighth group of the periodic system and the heavy metals from the first group of the periodic system, for such a period of time that not only the sulphur or oxygen compounds present in the materials under treatment, but also the nitrogen and halogen compounds are converted into the hydrides of sulphur, oxygen, nitrogen and halogen, respectively, and that the resinifying substances are saturated with hydrogen, without the occurrence of any appreciable splitting up of the initial hydrocarbon itself, separating the said hydrides from the resulting hydrocarbon, and saturating the double bonds of the hydrocarbon thus obtained with hydrogen at an elevated temperature below 350° C. in the presence of a catalyst promoting the hydrogenation of double carbon bonds.

8. A process for the production of hydrocarbons completely saturated with hydrogen, from crude hydrocarbons containing double bonds, which comprises treating an initial material of the said nature with hydrogen under a pressure between 1 and 200 atmospheres at a temperature of between 200° and 350° C. in the presence of a catalyst comprising a compound of a metal from the sixth group of the periodic system with a metalloid from the sixth group of the periodic system, in admixture with a substance comprising a metal selected from the class consisting of the metals from the eighth group of the periodic system and the heavy metals from the first group of the periodic system, for such a period of time that not only the sulphur or oxygen compounds present in the materials under treatment but also the nitrogen and halogen compounds are converted into the hydrides of sulphur, oxygen, nitrogen and halogen respectively and that the resinifying substances are saturated with hydrogen, but for an insufficient period of time to effect any appreciable splitting up of the initial hydrocarbon itself, separating the said hydrides from the resulting hydrocarbon, and saturating the double bonds of the hydrocarbon thus obtained with hydrogen at an elevated temperature below 350° C. in the presence of a catalyst promoting the hydrogenation of double carbon bonds.

9. A process for the production of hydrocarbons completely saturated with hydrogen, from crude hydrocarbons containing double bonds, which comprises treating an initial material of the said nature with hydrogen under a pressure between 1 and 200 atmospheres at a temperature of between 200° and 350° C. in the presence of a catalyst comprising a compound of a metal from the sixth group of the periodic system with a metalloid from the sixth group of the periodic system, in admixture with a substance comprising a metal selected from the group consisting of cadmium and zinc, for such a period of time that not only the sulphur or oxygen compounds present in the materials under treatment but also the nitrogen and halogen compounds are converted into the hydrides of sulphur, oxygen, nitrogen and halogen respectively and that the resinifying substances are saturated with hydrogen, but for an insufficient period of time to effect any appreciable splitting up of the initial hydrocarbon itself, separating the said hydrides from the resulting hydrocarbon, and saturating the double bonds of the hydrocarbon thus obtained with hydrogen at an elevated temperature below 350° C. in the presence of a catalyst promoting the hydrogenation of double carbon bonds.

10. A process for the production of hydrocarbons completely saturated with hydrogen, from crude hydrocarbons containing double bonds, which comprises treating an initial material of the said nature with a gas comprising hydrogen at a temperature between about 200° and 450° C. in the presence of a catalyst comprising a compound of a metal from the fourth to the sixth group of the periodic system with a metalloid from the sixth group of the periodic system for such a period of time that not only the sulphur or oxygen compounds present in the materials under treatment, but also the nitrogen and halogen compounds are converted into the hydrides of sulphur, oxygen, nitrogen and halogens respectively and that the resinifying substances are saturated with hydrogen, but for an insufficient period of time to effect any appreciable splitting up of the initial hydrocarbon itself, separating the said hydrides from the resulting hydrocarbon and saturating the double bonds of the hydrocarbon thus obtained with hydrogen at an elevated temperature below 350° C. in the presence of a catalyst promoting the hydrogenation of double carbon bonds and which comprises a metal selected from the group consisting of nickel, cobalt and copper.

11. A process for the production of hydrocarbons completely saturated with hydrogen, from crude hydrocarbons containing double bonds, which comprises treating an initial material of the said nature with hydrogen under a pressure between 1 and 200 atmospheres at a temperature of between 200° and 350° C. in the presence of a catalyst comprising a compound of a metal from the sixth group of the periodic system with a metalloid from the sixth group of the periodic system, for such a period of time that not only the sulphur or oxygen compounds present in the materials under treatment but also the nitrogen and halogen compounds are converted into the hydrides of sulphur, oxygen, nitrogen and halogen respectively and that the resinifying substances are saturated with hydrogen, but for an insufficient period of time to effect any appreciable splitting up of the initial hydrocarbon itself, separating the said hydrides from the resulting hydrocarbon, and by saturating the double bonds of the hydrocarbon thus obtained with hydrogen at an elevated temperature below 350° C. in the presence of a catalyst comprising nickel.

12. A process for the production of hydrocarbons completely saturated with hydrogen from crude American gas oil which comprises treating said oil with hydrogen under a pressure between 1 and 200 atmospheres at a temperature of between 200° and 350° C. in the presence of a catalyst comprising a compound of a metal from the sixth group of the periodic system with a metalloid from the sixth group of the periodic system for such a period of time that not only the sulphur or oxygen compounds present in the materials under treatment but also the nitrogen and halogen compounds are converted into the hydrides of sulphur, oxygen, nitrogen and halogen respectively and that the resinifying substances are saturated with hydrogen, but for an insufficient period of time to effect any appreciable splitting up of the initial hydrocarbon itself, separating the said hydrides from the resulting hydrocarbon, and saturating the double bonds of the hydrocarbon thus obtained with hydrogen at an elevated temperature below 350° C. in the presence of a catalyst promoting the hydrogenation of double carbon bonds.

13. A process for the production of hydrocarbons completely saturated with hydrogen from crude naphthalene which comprises treating said naphthalene with hydrogen under a pressure between 1 and 200 atmospheres at a temperature of between 200° and 350°

C. in the presence of a catalyst comprising a compound of a metal from the sixth group of the periodic system with a metalloid from the sixth group of the periodic system for such a period of time that not only the sulphur or oxygen compounds present in the materials under treatment but also the nitrogen and halogen compounds are converted into the hydrides of sulphur, oxygen, nitrogen and halogen respectively and that the resinifying substances are saturated with hydrogen, but for an insufficient period of time to effect any appreciable splitting up of the initial hydrocarbon itself, separating the said hydrides from the resulting hydrocarbon, and saturating the double bonds of the hydrocarbon thus obtained with hydrogen at an elevated temperature below 350° C. in the presence of a catalyst promoting the hydrogenation of double carbon bonds.

14. A process for the production of hydrocarbons completely saturated with hydrogen, from crude hydrocarbons containing double bonds, which comprises passing 25 parts by volume hourly of a fraction having a boiling point range of from 215° to 275° C. obtained by the destructive hydrogenation of brown coal over 100 parts by volume of a catalyst comprising equal amounts of the sulphides of zinc and molybdenum at a temperature of 350° C. and with hydrogen at a pressure of 50 atmospheres, and hydrogenating the product thus obtained at an elevated temperature below 350° C. in the presence of a catalyst comprising nickel.

15. A process for the production of hydrocarbons completely saturated with hydrogen, from crude hydrocarbons containing double bonds, which comprises treating an initial material of the said nature with hydrogen under a pressure between 1 and 200 atmospheres at a temperature of between 200° and 350° C. in the presence of a catalyst comprising a compound of a metal from the sixth group of the periodic system with a metalloid from the sixth group of the periodic system, for such a period of time that not only the sulphur or oxygen compounds present in the materials under treatment but also the nitrogen and halogen compounds are converted into the hydrides of sulphur, oxygen, nitrogen and halogen respectively and that the resinifying substances are saturated with hydrogen but for an insufficient period of time to effect any appreciable splitting up of the initial hydrocarbons separating the said hydrides from the resulting hydrocarbons, and saturating the double bonds of the hydrocarbons thus obtained with hydrogen at an elevated temperature below 350° C. in the presence of a catalyst promoting the hydrogenation of double carbon bonds.

In testimony whereof I have hereunto set my hand.

EUGEN DORRER.